(12) United States Patent
Konicek

(10) Patent No.: US 10,640,229 B2
(45) Date of Patent: May 5, 2020

(54) HYDRAULICALLY ASSISTED RAT ACTUATOR LATCH MECHANISM

(71) Applicant: Hamilton Sundstrand Corporation, Charlotte, NC (US)

(72) Inventor: Timothy Scott Konicek, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 932 days.

(21) Appl. No.: 15/198,777

(22) Filed: Jun. 30, 2016

(65) Prior Publication Data

US 2018/0002031 A1 Jan. 4, 2018

(51) Int. Cl.
*B64D 41/00* (2006.01)
*F15B 13/01* (2006.01)
*F15B 15/26* (2006.01)

(52) U.S. Cl.
CPC ............ *B64D 41/007* (2013.01); *F15B 13/01* (2013.01); *F15B 15/26* (2013.01); *B64D 2041/002* (2013.01)

(58) Field of Classification Search
CPC .......... B64D 41/007; B64D 2041/002; B64D 41/00; F15B 13/01; F15B 15/06; F15B 15/26; F15B 15/261
See application file for complete search history.

(56) References Cited

U.S. PATENT DOCUMENTS

| | | | | |
|---|---|---|---|---|
| 3,504,406 A * | 4/1970 | Schott | ..................... | E05B 65/00 24/603 |
| 5,288,037 A * | 2/1994 | Derrien | ................... | B64C 25/26 244/102 SL |
| 5,379,969 A * | 1/1995 | Marx | ........................ | B64C 3/56 244/49 |
| 2003/0164421 A1* | 9/2003 | Collet | .................... | B64C 25/26 244/102 R |

FOREIGN PATENT DOCUMENTS

CN 104229125 A 12/2014
EP 0703358 B1 3/1996

* cited by examiner

*Primary Examiner* — Nathan Cumar
(74) *Attorney, Agent, or Firm* — Cantor Colburn LLP

(57) ABSTRACT

A ram air turbine actuator having: a housing; at least one solenoid; a latch mechanism operably connected to the at least one solenoid and located within the housing, the latch mechanism in operation moves from a first position to second position when the at least one solenoid is activated; and a hydraulic pressure system operably connected to the latch mechanism, the hydraulic pressure system in operation moves the latch mechanism from the second position to the first position using hydraulic pressure from a hydraulic fluid, when the at least one solenoid is deactivated. The hydraulic pressure system is located within the housing. The hydraulic pressure is relieved when the latch mechanism is in the first position.

14 Claims, 5 Drawing Sheets

HYDRAULICALLY ASSISTED RAT ACTUATOR LATCH MECHANISM

BACKGROUND

The subject matter disclosed herein generally relates to ram air turbine (RAT) actuators, and more specifically a latch mechanism for use in a RAT actuator.

RATs are commonly used on modern aircraft to provide a secondary and/or emergency power source in the event the primary power source is insufficient or fails. A typical RAT remains internal to the aircraft until needed. When additional power is required, a door in the aircraft's fuselage will open and the actuator will deploy the RAT into the freestream air. The turbine is rotated by the freestream air and the rotational power from the turbine is transferred through a drivetrain to be converted into electrical power by a generator or hydraulic power by a pump, or both.

Solenoids are conventionally used to initiate the actuation of a RAT actuator in order to deploy the RAT into the freestream air. Deployment of the RAT requires tripping a release mechanism, known as a latch mechanism. The solenoids trip the latch mechanism, which allows a lockbolt to axially translate and trigger a series of events causing the actuator to extend deploying the RAT. Hydraulic pressure is required to retract the extended actuator and then a biasing mechanism is used to reset the latch mechanism.

The solenoid deployment force must overcome a variety of forces to deploy the RAT. These force may include friction in the latch mechanism, the force necessary to impart slight axial movement of the lockbolt, and the force excreted by the reset plunger. The solenoid deployment forces are typically limited by weight and aircraft power consumption constraints. This limits the permissible opposing force that is exerted by the biasing mechanism. A low force biasing mechanism is commonly used, so as not to require extensive solenoid deployment forces in order to overcome the opposing biasing mechanism. A low force biasing mechanism has minimal force margin which may prove insufficient to overcome various release mechanism forces that can increase as the actuator ages. The inability to overcome these forces may results in higher occurrences of the biasing mechanism failing to reset the latch mechanism and a more robust solution is desired.

SUMMARY

According to one embodiment, a ram air turbine actuator is provided. The ram air turbine actuator having: a housing; at least one solenoid; a latch mechanism operably connected to the at least one solenoid and located within the housing, the latch mechanism in operation moves from a first position to second position when the at least one solenoid is activated; and a hydraulic pressure system operably connected to the latch mechanism, the hydraulic pressure system in operation moves the latch mechanism from the second position to the first position using hydraulic pressure from a hydraulic fluid, when the at least one solenoid is deactivated. The hydraulic pressure system is located within the housing. The hydraulic pressure is relieved when the latch mechanism is in the first position.

In addition to one or more of the features described above, or as an alternative, further embodiments of the ram air turbine actuator may include that the latch mechanism further includes: a lockbolt having a first biasing mechanism, the first biasing mechanism in operation moves the lockbolt in a first direction, when the at least one solenoid is activated; a toggle roller operably connected to the lockbolt, the toggle roller prevents motion by lockbolt in the first direction when the at least one solenoid is deactivated; a toggle latch operably connected to the toggle roller and the at least one solenoid, the toggle latch in operation moves the toggle roller in a second direction when the at least one solenoid is activated; a reset plunger operably connected to the toggle latch; and a second biasing mechanism operably connected to the reset plunger, the second biasing mechanism prevents motion of the reset plunger and the toggle latch in a second direction when the at least one solenoid is deactivated.

In addition to one or more of the features described above, or as an alternative, further embodiments of the ram air turbine actuator may include that the hydraulic pressure system is operably connected to the latch mechanism through the reset plunger, the hydraulic fluid in operation moves the reset plunger in a direction opposite the second direction until the latch mechanism is in the first position.

In addition to one or more of the features described above, or as an alternative, further embodiments of the ram air turbine actuator may include that the hydraulic pressure system further includes: a reset plunger hydraulic chamber containing the reset plunger; and an actuator stow hydraulic chamber fluidly connected to the reset plunger through fluid channels.

In addition to one or more of the features described above, or as an alternative, further embodiments of the ram air turbine actuator may include that the hydraulic pressure system further includes: a reset plunger hydraulic chamber containing the reset plunger; and an actuator stow hydraulic chamber fluidly connected to the reset plunger through fluid channels.

In addition to one or more of the features described above, or as an alternative, further embodiments of the ram air turbine actuator may include that the second biasing mechanism is a spring.

According to another embodiment, a method of retracting a ram air turbine actuator is provided. The method having the steps of: moving a latch mechanism from a second position to a first position using hydraulic pressure from a hydraulic fluid. The latch mechanism locks the ram air turbine actuator in a retracted position when the latch mechanism is in the first position. The hydraulic pressure is relieved when the latch mechanism is in the first position.

In addition to one or more of the features described above, or as an alternative, further embodiments of the method may include that the moving the latch mechanism further includes the steps of: moving a lockbolt to a retracted position using hydraulic pressure from the hydraulic fluid; moving a reset plunger to a locked position using hydraulic pressure from the hydraulic fluid; moving a toggle latch using the reset plunger, the toggle latch having a toggle roller; securing the lockbolt in the retracted position using the toggle roller; and securing the reset plunger in the locked position using a second biasing mechanism.

In addition to one or more of the features described above, or as an alternative, further embodiments of the method may include that the hydraulic pressure system further includes: a reset plunger hydraulic chamber containing the reset plunger; and an actuator stow hydraulic chamber fluidly connected to the reset plunger through fluid channels.

In addition to one or more of the features described above, or as an alternative, further embodiments of the method may include that the second biasing mechanism is a spring.

According to another embodiment a method of manufacturing a ram air turbine actuator is provide. The method included the steps of: forming an actuator housing; installing at least one solenoid in the actuator housing; installing a latch mechanism in the actuator housing; operably connecting the latch mechanism to the at least one solenoid, the latch mechanism in operation moves from a first position to second position when the at least one solenoid is activated; and operably connecting the latch mechanism to a hydraulic pressure system, the hydraulic pressure system in operation moves the latch mechanism from the second position to the first position using hydraulic pressure from a hydraulic fluid, when the at least one solenoid is deactivated. The hydraulic pressure system is located within the housing.

In addition to one or more of the features described above, or as an alternative, further embodiments of the method of manufacturing may include that the latch mechanism further includes: a lockbolt having a first biasing mechanism, the first biasing mechanism in operation moves the lockbolt in a first direction, when the at least one solenoid is activated; a toggle roller operably connected to the lockbolt, the toggle roller prevents motion by lockbolt in the first direction when the at least one solenoid is deactivated; a toggle latch operably connected to the toggle roller and the at least one solenoid, the toggle latch in operation moves the toggle roller in a second direction when the at least one solenoid is activated; a reset plunger operably connected to the toggle latch; and a second biasing mechanism operably connected to the reset plunger, the second biasing mechanism prevents motion of the reset plunger and the toggle latch in a second direction when the at least one solenoid is deactivated.

In addition to one or more of the features described above, or as an alternative, further embodiments of the method of manufacturing may include that the hydraulic fluid is operably connected to the latch mechanism through the reset plunger, the hydraulic fluid in operation moves the reset plunger in a direction opposite the second direction until the latch mechanism is in the first position.

In addition to one or more of the features described above, or as an alternative, further embodiments of the method of manufacturing may include that the second biasing mechanism is a spring.

In addition to one or more of the features described above, or as an alternative, further embodiments of the method of manufacturing may include that the hydraulic pressure system further includes: a reset plunger hydraulic chamber containing the reset plunger; and an actuator stow hydraulic chamber fluidly connected to the reset plunger through fluid channels.

In addition to one or more of the features described above, or as an alternative, further embodiments of the method of manufacturing may include that the hydraulic pressure system further includes: a reset plunger hydraulic chamber containing the reset plunger; and an actuator stow hydraulic chamber fluidly connected to the reset plunger through fluid channels.

Technical effects of embodiments of the present disclosure include utilizing hydraulic pressure to aid a biasing mechanism in moving a latch mechanism of a ram air turbine actuator to a locked position.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
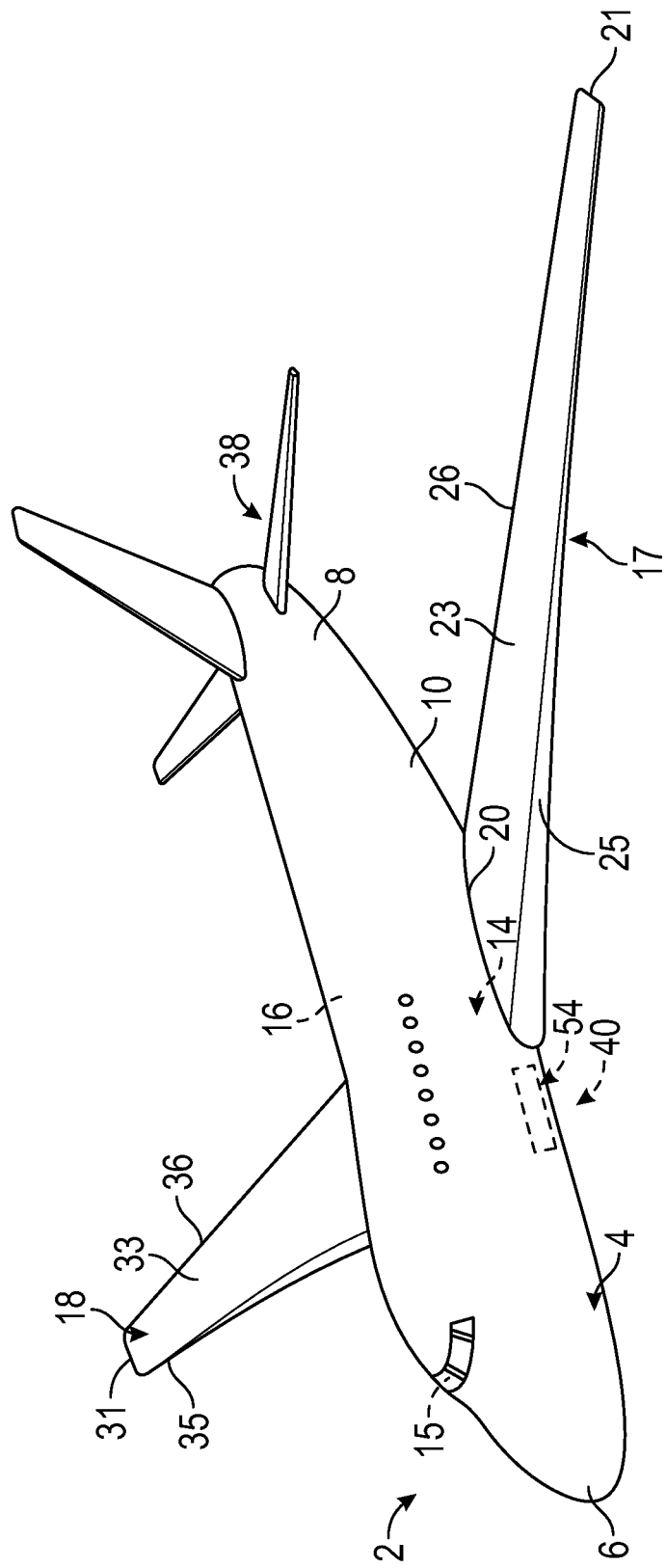
FIG. 1 is a perspective view of an aircraft that may incorporate embodiments of the present disclosure.
Figure 2:
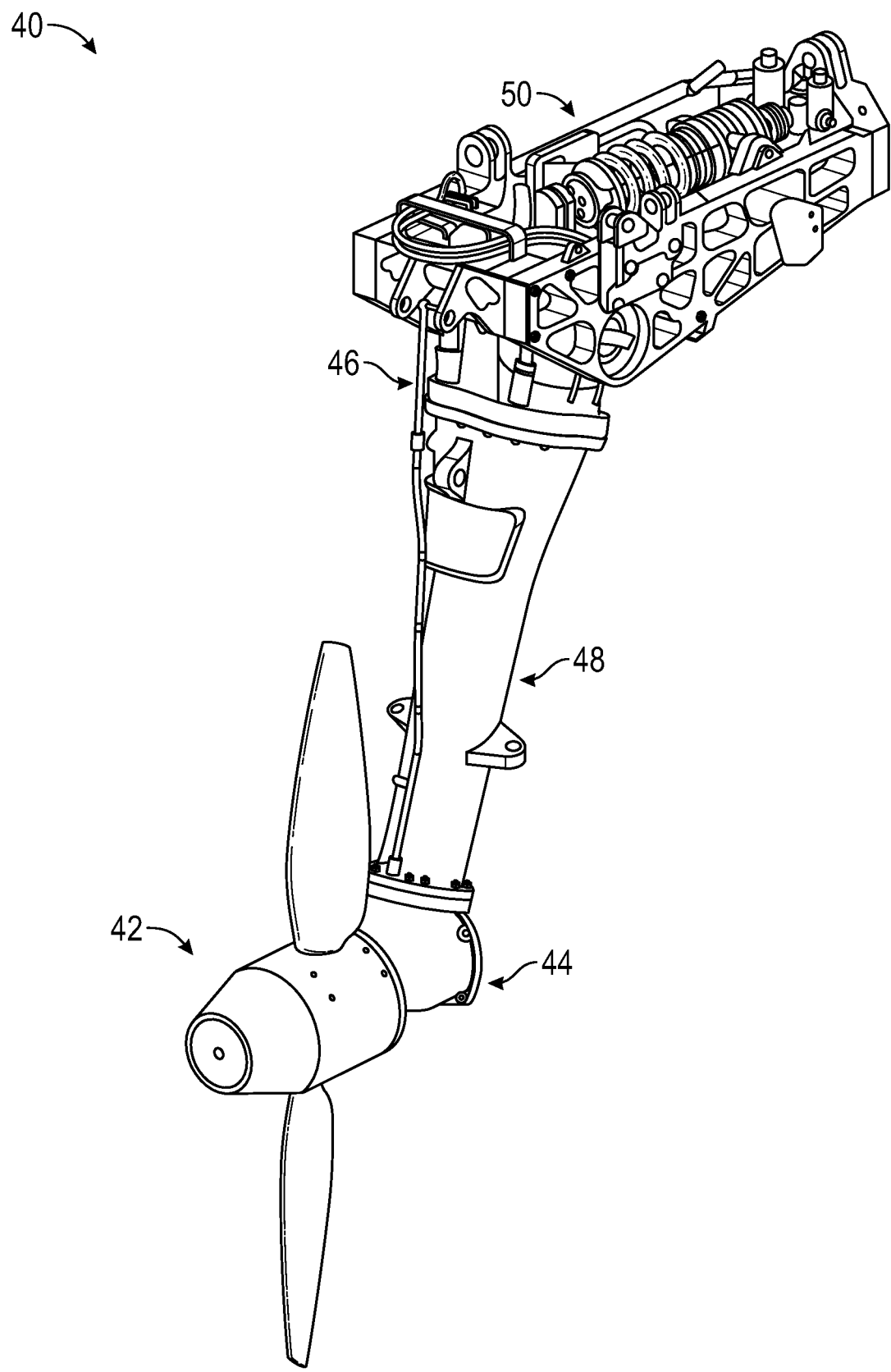
FIG. 2 is a perspective view of ram air turbine (RAT) assembly that may incorporate embodiments of the present disclosure.

With reference now to FIGS. 1 and 2, FIG. 1 shows a perspective view of an aircraft 2 that may incorporate embodiments of the present disclosure and FIG. 2 shows a perspective view of ram air turbine (RAT) assembly 40 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Aircraft 2 includes a ram air turbine (RAT) assembly 40 mounted within fuselage 4, nose portion 6, or wings 17, 18. When additional electrical and/or hydraulic power is required, an actuator 50 will actuate to open a compartment door 54 and deploy the RAT assembly 40 into the freestream air. As shown in FIG. 2, the RAT assembly 40 may include a turbine assembly 42, a gearbox assembly 44, a strut assembly 48, a generator 46, and the actuator 50. As the turbine assembly 42 rotates, the rotational torque is transferred from the turbine assembly 42, through the gearbox assembly 44 to a driveshaft (not shown) in the strut assembly 48, and then to the generator 46. The generator 46 may be an electrical generator, hydraulic pump, or both an electrical generator and a hydraulic pump.

Figure 3:
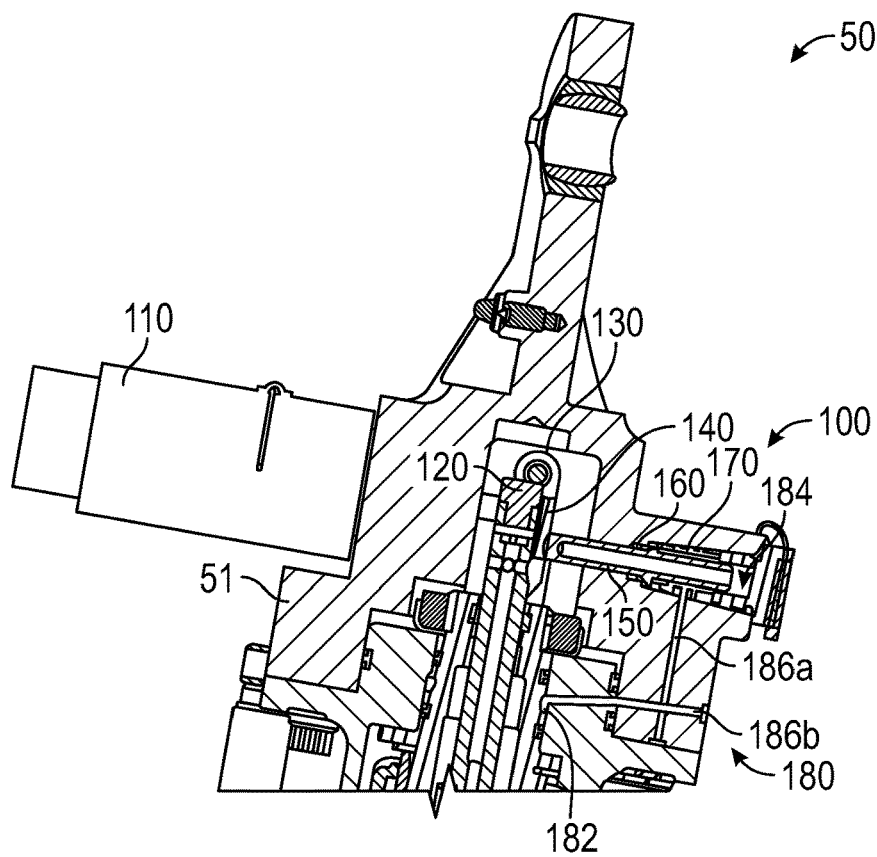
FIG. 3 is a cross-sectional side view of an actuator for use in the RAT assembly of FIG. 2, according to an embodiment of the present disclosure.
Figure 4:
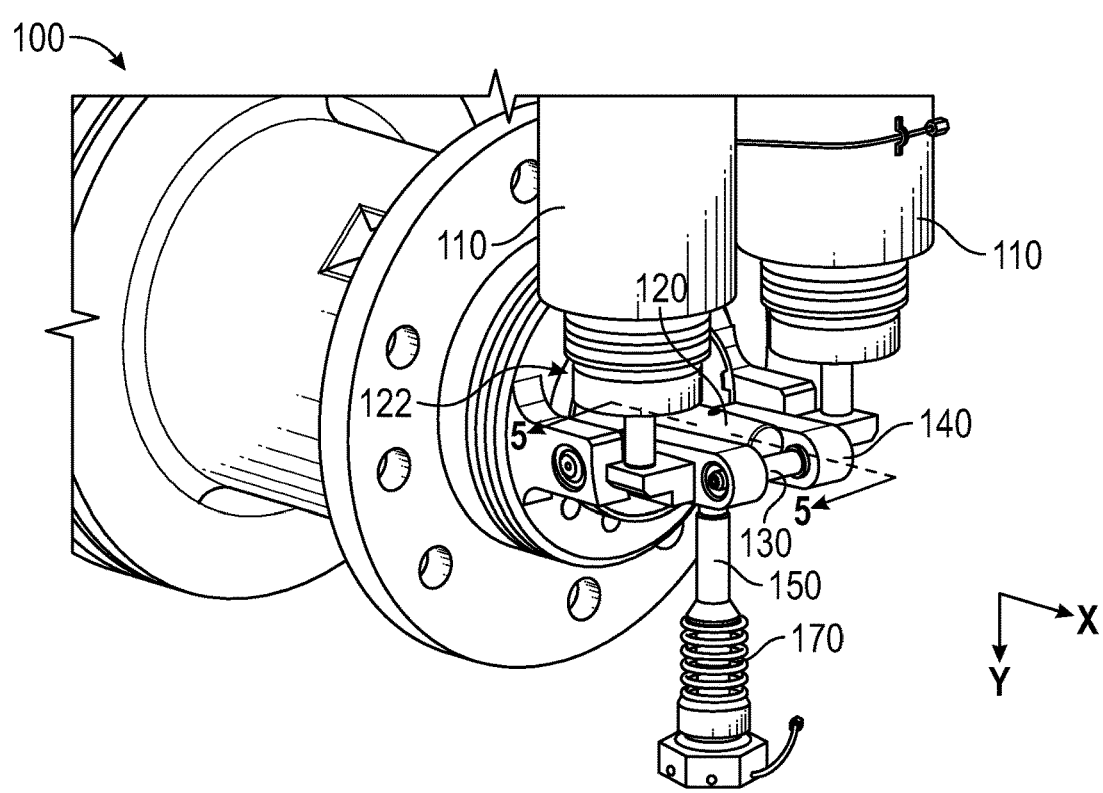
FIG. 4 is a perspective view of the latch mechanism of the actuator of FIG. 3, according to an embodiment of the present disclosure.
Figure 5:
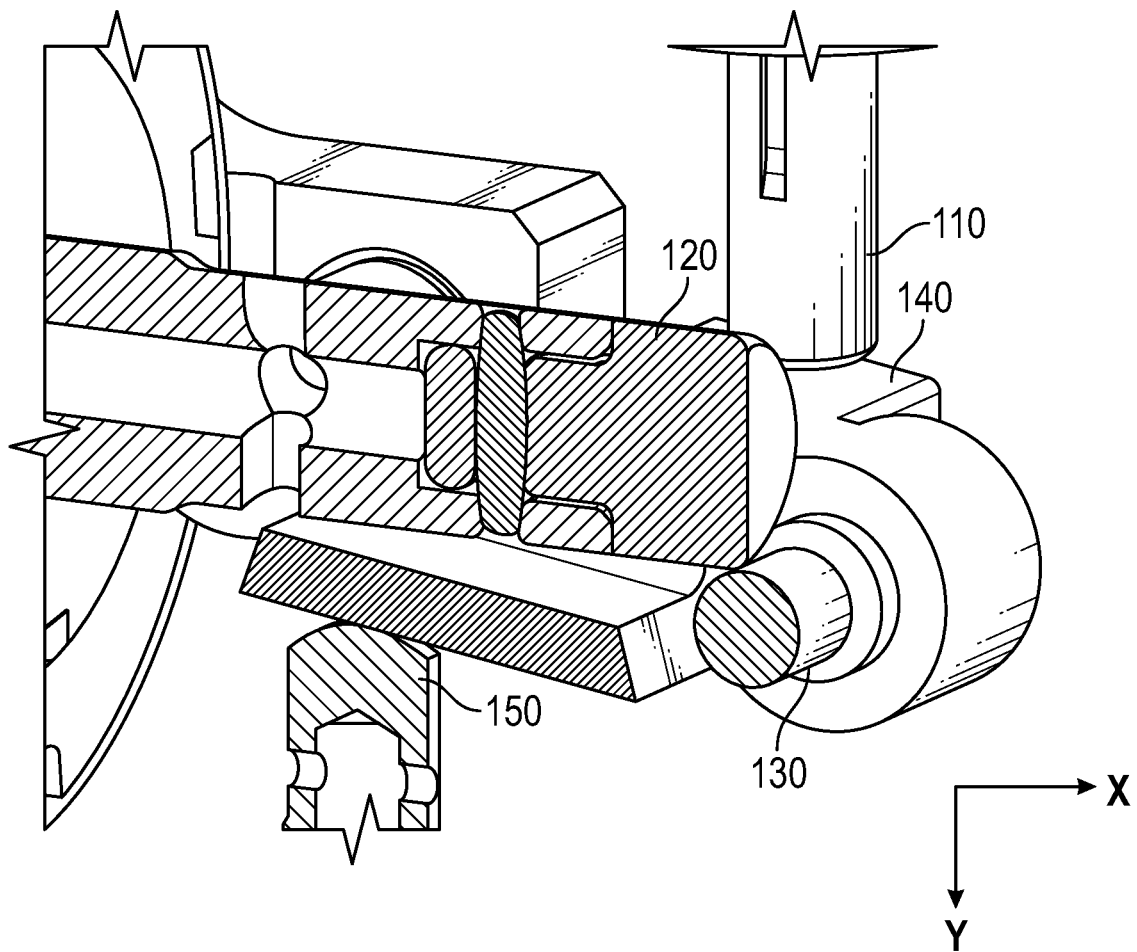
FIG. 5 is a cross-sectional view of a latch mechanism of FIG. 4, according to an embodiment of the present disclosure.

Referring now to FIGS. 3-5, various embodiments of the present disclosure are illustrated. FIG. 3 shows a cross-sectional side view of an actuator 50 for use in the RAT assembly 40 of FIG. 2, according to an embodiment of the present disclosure. FIG. 4 shows a perspective view of an example of a latch mechanism 100 for use in the actuator 50, according to an embodiment of the present disclosure. FIG. 5 shows a cross-sectional view of the latch mechanism 100 of FIG. 4, according to an embodiment of the present disclosure. The actuator 50 includes at least one solenoid 110, a latch mechanism 100, and a hydraulic pressure system 180, as seen in FIG. 3. In the illustrated embodiment, the actuator 50 includes two solenoids; however an actuator 50 may include one or more solenoids 110. The latch mechanism 100 in operation moves from a first position to second position when the solenoids 110 are activated. The first position may be a locked position where the actuator 50 is retracted and the second position may be an unlocked position where the actuator 50 is extended to deploy the RAT 40. The hydraulic pressure system 180 is operably connected to the latch mechanism 100. The hydraulic pressure system 180 in operation moves the latch mechanism 100 from the second position to the first position using hydraulic pressure from a hydraulic fluid, when the solenoids 110 are deactivated. The hydraulic pressure is relieved when the latch mechanism 100 is in the first position. In an embodiment, the hydraulic pressure system 180 may be located within the housing 51, as seen in FIG. 3.

In the illustrated embodiment, the latch mechanism 100 includes a lockbolt 120, a toggle roller 130, a toggle latch 140, a reset plunger 150, and a reset plunger spring 170, as seen in FIGS. 4-5. The lockbolt 120 includes a first biasing mechanism 122 internal to the actuator (NOTE: Only a location of the first biasing mechanism 122 is shown in FIG. 4). The first biasing mechanism 122 in operation moves the lockbolt 120 axially in a first direction X, when at least one solenoid 110 is activated. In an embodiment, the first biasing mechanism 122 is a spring. The toggle roller 130 is operably connected to the lockbolt 120. The toggle roller 130 prevents motion by lockbolt 120 in the first direction X when the solenoids 110 are deactivated. The toggle latch 140 is operably connected to the toggle roller 130 and the solenoids 110. The toggle latch 140 in operation moves the toggle roller 130 in a second direction Y when the solenoids 110 are activated. The reset plunger 150 is operably connected to the toggle latch 140. The second biasing mechanism 170 is operably connected to the reset plunger 150. The second biasing mechanism 170 prevents motion of the reset plunger 150 and the toggle latch 140 in a second direction Y when the solenoids 110 are deactivated. In an embodiment, the second biasing mechanism 170 may be a spring.

Actuation or extension of the actuator 50 requires moving the toggle roller 130 in the second direction Y, which allows the lockbolt 120 to travel axially in the first direction X due to the preload of the first biasing mechanism 122. The axial movement of the lockbolt 120 triggers a series of events that allows the actuator 50 to extend, thus deploying the RAT 40. The actuation sequence is initiated by energizing at least one solenoid 110 to impart a force on the toggle latch 140 in the second direction Y. The movement of the toggle latch 140 in the second direction Y also moves the toggle roller 130 in the second direction Y. Previously, the toggle roller 130 was preventing the lockbolt 120 from moving in the first direction X but once the toggle roller 130 moves in the second direction Y the first biasing mechanism 122 is free to move the lockbolt 120 in first direction X. The movement of the toggle latch 140 in the second direction Y also moves the reset plunger 150 in the second direction Y and compresses the second biasing mechanism 170. Thus, in order to achieve extension of the actuator 50, the solenoid 110 must impart a deployment force on the toggle latch 140 large enough to overcome a force of friction in the toggle latch 140, a force to impart a slight axial movement of the lockbolt 120 and a force to compress the second biasing mechanism 170.

Retraction of the actuator 50 initiates with the solenoids 110 being deactivated. Hydraulic pressure in a stow hydraulic chamber 182 causes the actuator to physically retract, while moving the lockbolt axially in a direction opposite the first direction X to a retracted position. Hydraulic fluid in the stow hydraulic chamber 182 is piped through a series of fluid channels 186a and 186b in the housing 51 to a reset plunger hydraulic chamber 184 to put hydraulic pressure on the reset plunger 170. Since the chambers 182, 184 are fluidly connected by the fluid channels 186a, 186b, an increase in hydraulic pressure in the stow hydraulic chamber 182 causes an increase in hydraulic pressure in the plunger hydraulic chamber 184. The hydraulic pressure on the reset plunger 150 moves the reset plunger in a direction opposite the second direction Y and into contact with the toggle latch 140. Subsequently, the toggle latch 140 also moves in a direction opposite the second direction Y and the toggle roller 130 moves in a direction opposite the second direction Y and secures the lockbolt 120 in the retracted position. Once the lockbolt 120 is secured in the retracted position hydraulic pressure is lowered in the stow hydraulic chamber 182 and the plunger hydraulic chamber 184. In the retracted position the force of the first biasing mechanism 122 on the lockbolt 120 is reacted axially by the toggle roller 130 and toggle latch 140, and then the toggle latch 140 force is reacted by second biasing mechanism 170 acting on the reset plunger 150.

As mentioned above, in order to achieve extension of the actuator 50, the solenoid 110 must impart a deployment force on the toggle latch 140 large enough to overcome a force of friction in the toggle latch 140, a force to impart a slight axial movement of the lockbolt 120 and a force to compress the second biasing mechanism 170. Deployment forces of solenoids to initiate actuation are generally small, which limits the possible preload of the second biasing mechanism 170. A lower preload of the second biasing mechanism 170 limits the ability of the second biasing mechanism to return the latch mechanism 100 to the locked position (first position). Additional forces may also hinder the ability of the second biasing mechanism 170 to return the latch mechanism 100 to the locked position. The additional forces may include forces such as, for example solenoid core residual magnetization; wring adhesion and/or fluid surface tension effect between the stop and plunger of the solenoid 110; and/or debris internal to the latch mechanism 100. These additional forces may increase as the latch mechanism 100 ages. Advantageously, the force capability of the latch mechanism 100 is no longer limited to the second biasing mechanism 170 preload alone. The hydraulic pressure system 180 aids the second biasing mechanism 170 by helping return the latch mechanism 100 to the locked position (first position). The hydraulic assistance by the hydraulic fluid provides additional force on the reset plunger 150 during retraction of the actuator 50, significantly enhancing the force capability of the reset plunger 50. Further advantageously, the magnitude of the hydraulic pressure can be altered by changing the size of reset plunger 150.

Figure 6:
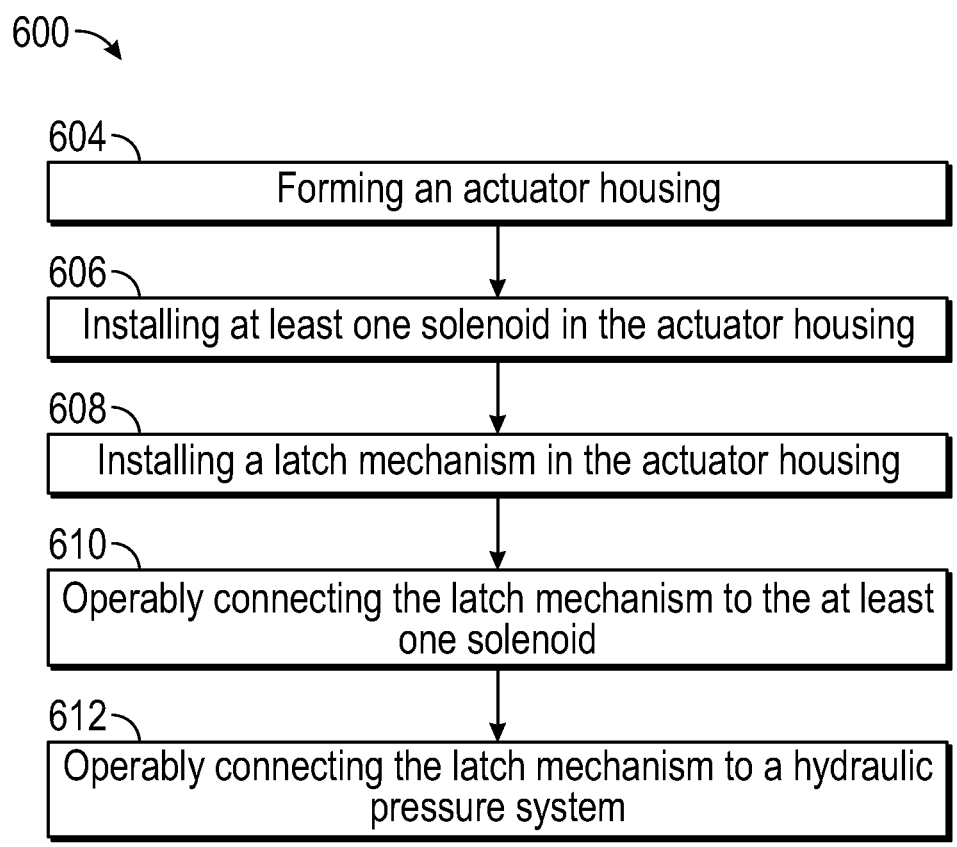
FIG. 6 is a flow process illustrating a method of manufacturing the RAT assembly of FIG. 2, according to an embodiment of the present disclosure.

Referring now to FIG. 6 while referencing components of the RAT actuator 50 of FIGS. 3-5. FIG. 6 shows a flow process illustrating a method of manufacturing the RAT assembly 50 of FIG. 2, according to an embodiment of the present disclosure. At block 604, an actuator housing 51 is formed. The actuator housing 51 has a reset plunger hydraulic chamber 184 and an actuator stow hydraulic chamber 182. The reset plunger hydraulic chamber 184 is fluidly connected to the actuator stow hydraulic chamber 182. The chambers 182, 184 may be fluidly connected to each other through fluid channels 186a, 186b. The fluid channels may be drilled and/or machined into the actuator housing 51. At block 606, at least one solenoid 110 is installed into the actuators housing 51. At block 608, the latch mechanism 100 is installed in the actuator housing. The latch mechanism 100 in operation locks and unlocks the ram air turbine actuator 50. At block 610, the latch mechanism 100 is operably connected to at least one solenoid 110. The latch mechanism 100 in operation moves from a first position to a second position when at least one solenoid 110 is activated. At block 612, the latch mechanism 100 is operably connected to the hydraulic pressure system 180. In an embodiment, the hydraulic pressure system 180 may be located within the housing 51, as seen in FIG. 3. The method 600 may include filling at least one of the reset plunger hydraulic chamber 184 and the actuator stow hydraulic chamber 182 with hydraulic fluid.

While the above description has described the flow process of FIG. 6 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A ram air turbine actuator comprising:
a housing;
at least one solenoid;
a latch mechanism operably connected to the at least one solenoid and located within the housing, the latch mechanism in operation moves from a first position to second position when the at least one solenoid is activated, wherein the latch mechanism further comprises:
a lockbolt having a first biasing mechanism, the first biasing mechanism in operation moves the lockbolt in a first direction, when the at least one solenoid is activated;
a toggle roller operably connected to the lockbolt, the toggle roller prevents motion by lockbolt in the first direction when the at least one solenoid is deactivated;
a toggle latch operably connected to the toggle roller and the at least one solenoid, the toggle latch in operation moves the toggle roller in a second direction when the at least one solenoid is activated;
a reset plunger operably connected to the toggle latch; and
a second biasing mechanism operably connected to the reset plunger, the second biasing mechanism prevents motion of the reset plunger and the toggle latch in the second direction when the at least one solenoid is deactivated; and
a hydraulic pressure system operably connected to the latch mechanism, the second biasing mechanism and the hydraulic pressure system in operation move the latch mechanism from the second position to the first position using force from the second biasing mechanism and hydraulic pressure from a hydraulic fluid, when the at least one solenoid is deactivated, wherein the hydraulic pressure system is located within the housing,
wherein the hydraulic pressure is relieved when the latch mechanism is in the first position and the second biasing mechanism retains the latch mechanism in the first position by preventing motion of the reset plunger and the toggle latch in the second direction when the at least one solenoid is deactivated.

2. The ram air turbine actuator of claim 1, wherein:
the hydraulic pressure system is operably connected to the latch mechanism through the reset plunger, the hydraulic fluid in operation moves the reset plunger in a direction opposite the second direction until the latch mechanism is in the first position.

3. The ram air turbine actuator of claim 2, wherein the hydraulic pressure system further comprises:
a reset plunger hydraulic chamber containing the reset plunger; and
an actuator stow hydraulic chamber fluidly connected to the reset plunger through fluid channels.

4. The ram air turbine actuator of claim 1, wherein the hydraulic pressure system further comprises:
a reset plunger hydraulic chamber containing the reset plunger; and
an actuator stow hydraulic chamber fluidly connected to the reset plunger through fluid channels.

5. The ram air turbine actuator of claim 1, wherein:
the second biasing mechanism is a spring.

6. A method of retracting a ram air turbine actuator, comprising:
moving a latch mechanism from a second position to a first position using hydraulic pressure from a hydraulic fluid and force from a second biasing mechanism;
preventing, using a toggle roller, motion of a lockbolt of the latch mechanism in a first direction when at least one solenoid is deactivated, the toggle roller being operably connected to the lockbolt;
wherein the latch mechanism locks the ram air turbine actuator in a retracted position when the latch mechanism is in the first position;
wherein the hydraulic pressure is relieved when the latch mechanism is in the first position and the second biasing mechanism retains the latch mechanism in the first position by preventing motion of a reset plunger and the toggle latch in a second direction when the at least one solenoid is deactivated.

7. The method of claim 6, wherein the moving the latch mechanism further comprises:
moving a lockbolt to a retracted position using hydraulic pressure from the hydraulic fluid;
moving the reset plunger to a locked position using hydraulic pressure from the hydraulic fluid;
moving a toggle latch using the reset plunger, the toggle latch having a toggle roller;

securing the lockbolt in the retracted position using the toggle roller; and securing the reset plunger in the locked position using the second biasing mechanism.

8. The method of claim 7, wherein the hydraulic pressure system further comprises:

a reset plunger hydraulic chamber containing the reset plunger; and an actuator stow hydraulic chamber fluidly connected to the reset plunger through fluid channels.

9. The method of claim 6, wherein:

the second biasing mechanism is a spring.

10. A method of manufacturing a ram air turbine actuator, comprising:

forming an actuator housing;

installing at least one solenoid in the actuator housing;

installing a latch mechanism in the actuator housing;

operably connecting the latch mechanism to the at least one solenoid, the latch mechanism in operation moves from a first position to second position when the at least one solenoid is activated, wherein the latch mechanism further comprises:

a lockbolt having a first biasing mechanism, the first biasing mechanism in operation moves the lockbolt in a first direction, when the at least one solenoid is activated;

a toggle roller operably connected to the lockbolt, the toggle roller prevents motion by lockbolt in the first direction when the at least one solenoid is deactivated;

a toggle latch operably connected to the toggle roller and the at least one solenoid, the toggle latch in operation moves the toggle roller in a second direction when the at least one solenoid is activated;

a reset plunger operably connected to the toggle latch; and a second biasing mechanism operably connected to the reset plunger, the second biasing mechanism prevents motion of the reset plunger and the toggle latch in second direction when the at least one solenoid is deactivated; and operably connecting the latch mechanism to a hydraulic pressure system, the second biasing mechanism and the hydraulic pressure system in operation move the latch mechanism from the second position to the first position using force from the second biasing mechanism and hydraulic pressure from a hydraulic fluid, when the at least one solenoid is deactivated, wherein the hydraulic pressure system is located within the housing.

11. The method of claim 10, wherein:

the hydraulic fluid is operably connected to the latch mechanism through the reset plunger, the hydraulic fluid in operation moves the reset plunger in a direction opposite the second direction until the latch mechanism is in the first position.

12. The method of claim 10, wherein:

the second biasing mechanism is a spring.

13. The method of claim 10, wherein the hydraulic pressure system further comprises:

a reset plunger hydraulic chamber containing the reset plunger; and an actuator stow hydraulic chamber fluidly connected to the reset plunger through fluid channels.

14. The method of claim 11, wherein the hydraulic pressure system further comprises:

a reset plunger hydraulic chamber containing the reset plunger; and an actuator stow hydraulic chamber fluidly connected to the reset plunger through fluid channels.

* * * * *